UNITED STATES PATENT OFFICE.

PHILIPP KOENIG, OF CUERO, TEXAS.

INSECTICIDE FOR BOLL-WEEVILS.

1,395,919. Specification of Letters Patent. Patented Nov. 1, 1921.

No Drawing. Application filed September 8, 1920. Serial No. 408,809.

*To all whom it may concern:*

Be it known that I, PHILIPP KOENIG, a citizen of the United States, residing at Cuero, in the county of De Witt and State of Texas, have invented a new and useful Insecticide for Boll-Weevils, of which the following is a specification.

The object of my invention is to provide a novel method of compounding an insecticide whereby the same will be effective in killing boll-weevils, as a result of their inhalation of the compound.

In preparing the compound I place twelve pounds of arsenic ($As_2O_3$) and four ounces of baking soda in six gallons of water, and boil until dissolved. The solution is then poured over three hundred pounds of wood ashes. When thoroughly moistened by the compound the ashes are placed in pans and thoroughly dried over a fire. It is then pulverized by putting through a fine screen sieve or mill. The insecticide thus produced is applied to the cotton stalks by a suitable machine which blows the poisoned dust over the rows of cotton. The boll-weevils are killed by inhaling the insecticide, and the effectiveness of the mixture does not depend upon their sucking it, as is the case with various prior insecticides used for killing boll-weevils. Thorough tests of the compound have shown that the boll-weevils are killed within between one and twelve hours after the application of my compound.

What I claim is:—

An insecticide compound for killing boll weevils as a result of their inhalation of the compound, consisting of a solution of arsenic and baking soda in water said solution being boiled until the ingredients are dissolved in the water, in combination with a large quantity of wood ashes with which the poisoned solution is thoroughly mingled and then dried in accordance with the steps hereinbefore specified and for the purposes described.

PHILIPP KOENIG.